United States Patent
Dahm (10) Patent No.: US 10,793,416 B2
(45) Date of Patent: Oct. 6, 2020

(54) FUEL VENT CONNECTOR, VENTING SYSTEM HAVING FUEL VENT CONNECTOR, AND METHOD

(71) Applicant: Sikorsky Aircraft Corporation, Stratford, CT (US)

(72) Inventor: Conrad J. Dahm, Seymour, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 160 days.

(21) Appl. No.: 15/759,355

(22) PCT Filed: Sep. 13, 2016

(86) PCT No.: PCT/US2016/051471
§ 371 (c)(1),
(2) Date: Mar. 12, 2018

(87) PCT Pub. No.: WO2017/048690
PCT Pub. Date: Mar. 23, 2017

(65) Prior Publication Data
US 2018/0251366 A1 Sep. 6, 2018

Related U.S. Application Data

(60) Provisional application No. 62/218,189, filed on Sep. 14, 2015.

(51) Int. Cl.
*B67D 7/04* (2010.01)
*F16L 37/096* (2006.01)
(Continued)

(52) U.S. Cl.
CPC ........ *B67D 7/0478* (2013.01); *B60K 15/035* (2013.01); *B60K 15/03504* (2013.01);
(Continued)

(58) Field of Classification Search
CPC ...... B67D 7/0478; B67D 37/14; B67D 37/16; B60K 15/035; B60K 15/03504; F16L 37/096; F16L 37/0842; F16L 37/0847
(Continued)

(56) References Cited

U.S. PATENT DOCUMENTS 763,317 A * 6/1904 Nelson ............... F16L 37/096
285/320
2,951,714 A * 9/1960 Carlberg ............... A47L 9/242
285/7

(Continued)

FOREIGN PATENT DOCUMENTS

EP 0233727 A2 8/1987
WO 2014172352 A1 10/2014

OTHER PUBLICATIONS

International Search Report; International Application No. PCT/US16/51471; dated Dec. 20, 2016, 9 pages.
(Continued)

Primary Examiner — Timothy L Maust
(74) Attorney, Agent, or Firm — Foley & Lardner LLP (57) ABSTRACT

A fuel vent connector includes a longitudinal axis and a flow path a long the longitudinal axis. The connector further includes a first portion pivotally supporting a plurality of fingers, each finger amongst the plurality of fingers having a latching head biased radially outwardly and configured to latch within a fuel vent opening. The connector further includes a second portion biased longitudinally away from the first portion with respect to the longitudinal axis. The flow path extends through the first and second portions, and longitudinal movement of the second portion towards the first portion moves the fingers radially inward.

18 Claims, 8 Drawing Sheets

(51) Int. Cl.
  *B64D 37/00* (2006.01)
  *B60K 15/035* (2006.01)
  *B64D 37/16* (2006.01)

(52) U.S. Cl.
  CPC ........... *B64D 37/005* (2013.01); *B64D 37/16* (2013.01); *F16L 37/096* (2013.01); *B60K 2015/03528* (2013.01); *B60Y 2200/51* (2013.01); *B60Y 2200/52* (2013.01)

(58) Field of Classification Search
  USPC ..................................... 141/383–386; 285/86
  See application file for complete search history.

(56) References Cited

U.S. PATENT DOCUMENTS

| | | | | |
|---|---|---|---|---|
| 2,952,482 A * | 9/1960 | Torres | ................... | F16L 37/121 285/313 |
| 3,041,089 A * | 6/1962 | Purves | ................ | F16L 37/1235 285/94 |
| 3,445,127 A * | 5/1969 | Clarke | ................ | F16L 37/1205 285/88 |
| 3,610,092 A * | 10/1971 | Miller | .................... | F41F 3/052 89/1.55 |
| 4,332,276 A * | 6/1982 | Spring | .................... | F16K 17/36 137/526 |
| 4,751,042 A * | 6/1988 | Ales | ......................... | G21C 5/08 376/353 |
| 5,435,358 A | 7/1995 | Kempka et al. | | |
| 6,302,447 B1 * | 10/2001 | Lee | ........................ | F16L 19/005 285/315 |
| 7,942,139 B1 * | 5/2011 | Rockwell | ......... | F02M 35/10118 123/188.7 |
| 8,091,578 B2 * | 1/2012 | Roth | ........................ | F16K 1/02 137/202 |
| 10,094,501 B2 * | 10/2018 | Bull | ...................... | E21B 33/038 |
| 2005/0146137 A1 * | 7/2005 | Davidson | .............. | E21B 33/038 285/322 |
| 2008/0185837 A1 * | 8/2008 | Danielson | ........... | F16L 37/0848 285/86 |
| 2010/0252125 A1 | 10/2010 | Roth et al. | | |
| 2010/0288503 A1 * | 11/2010 | Cuiper | ................... | E21B 33/038 166/341 |
| 2013/0069361 A1 * | 3/2013 | Cai | ..................... | F16L 37/0925 285/133.21 |
| 2015/0069755 A1 | 3/2015 | Bull et al. | | |
| 2017/0030499 A1 * | 2/2017 | Flynn | ...................... | F16L 25/01 |

OTHER PUBLICATIONS

Written Opinion of the International Search Report; International Application No. PCT/US16/51471; dated Dec. 20, 2016, 7 pages.
Extended European Search Report for European Application 16847126.6; Report dated Mar. 27, 2019 (pp. 1-11).

* cited by examiner

FIG. 14

FUEL VENT CONNECTOR, VENTING SYSTEM HAVING FUEL VENT CONNECTOR, AND METHOD

CROSS REFERENCE TO RELATED APPLICATIONS

This application is a National Stage application of PCT/US2016/051471, filed Sep. 13, 2016, which claims the benefit of U.S. Provisional Application No. 62/218,189, filed Sep. 14, 2015, both of which are incorporated by reference in their entirety herein.

BACKGROUND

During a refueling operation of an aircraft, a venting system to suction fumes from a fuel tank or fuel cell is connected to a fuel vent opening using a connector. The fuel vent opening is first accessed by removing a fuel cap that is attached to the fuel vent opening by a lanyard. The venting system is attached to the connector using PVC pipes and elbows for supporting components of the venting system, such as a venturi. The connector is typically a relatively heavy component in order for the connector to maintain the connection within the vent opening while still at least partially supporting the weight of the venting system with respect to the aircraft. The fuel vent opening includes a flange with notches such that fixed protrusions on the connector must be matched up with the notches in the fuel vent opening. The connector is then rotated to misalign the protrusions from the notches to secure the connector within the fuel vent opening. During rotation of the connector, particularly if the connector is rotated in an incorrect direction, the lanyard attached to the fuel vent opening may become sheared by the heavy connector and fall into the fuel tank. Retrieval of the lanyard may require disassembly of the tank and other time consuming and cumbersome procedures.

Accordingly there exists a need for improved devices and systems for connecting a fuel vent opening to a venting system.

BRIEF DESCRIPTION

A fuel vent connector includes a longitudinal axis and a flow path along the longitudinal axis. The connector further includes a first portion pivotally supporting a plurality of fingers, each finger amongst the plurality of fingers having a latching head biased radially outwardly and configured to latch within a fuel vent opening. The connector further includes a second portion biased longitudinally away from the first portion with respect to the longitudinal axis. The flow path extends through the first and second portions, and longitudinal movement of the second portion towards the first portion moves the fingers radially inward.

In addition to one or more of the features described above or below, or as an alternative, further embodiments could include the first portion fixedly attached to a vacuum hose, and the second portion may be longitudinally movable with respect to the vacuum hose.

In addition to one or more of the features described above or below, or as an alternative, further embodiments could include a plurality of springs between the first and second portions.

In addition to one or more of the features described above or below, or as an alternative, further embodiments could include a plurality of rods fixedly attached to the second portion and movable through the first portion, and each finger may include a first end having the latching head and a second end connected to a respective rod amongst the plurality of rods.

In addition to one or more of the features described above or below, or as an alternative, further embodiments could include each finger including a pivot point between the first and second ends of the finger, and longitudinal movement of the second portion towards the first portion may move the rods to pivot the plurality of fingers radially inward.

In addition to one or more of the features described above or below, or as an alternative, further embodiments could include wherein each of the plurality of rods extending substantially parallel to the longitudinal axis of the fuel vent connector.

In addition to one or more of the features described above or below, or as an alternative, further embodiments could include a plurality of springs, each spring amongst the plurality of spring surrounding a respective rod amongst the plurality of rods. The plurality of springs may bias the second portion away from the first portion.

In addition to one or more of the features described above or below, or as an alternative, further embodiments could include each of the first and second portions including an outer lip region, the first portion further including an end region longitudinally opposite the outer lip region of the first portion, the latching head of each finger disposed adjacent the end region, and the outer lip region of the first portion having a greater width than an end region of the first portion.

In addition to one or more of the features described above or below, or as an alternative, further embodiments could include the first and second outer lip regions having a substantially same width.

In addition to one or more of the features described above or below, or as an alternative, further embodiments could include the first portion including a main body, the main body having an end region, an outer lip region, and a first set of rod receiving apertures, the end region configured for insertion into the fuel vent opening, and the outer lip region having a greater width than a width of the end region, and the second portion may include a second set of rod receiving apertures. The connector may further include a plurality of rods received respectively within the first and second set of rod receiving apertures, each finger amongst the plurality of fingers including a first end having the latching head and a second end connected to one of the plurality of rods, each finger pivotally attached to the first portion between the first and second ends.

A venting system includes a vacuum hose having a first end and a second end and a fuel vent connector operatively connected to the first end of the vacuum hose. The fuel vent connector includes a longitudinal axis and a flow path along the longitudinal axis. The flow path fluidically connects to an interior of the vacuum hose. The fuel vent connector also includes a first portion pivotally supporting a plurality of fingers, each finger amongst the plurality of fingers having a latching head biased radially outwardly and configured to latch within a fuel vent opening. The fuel vent connector further includes a second portion biased longitudinally away from the first portion with respect to the longitudinal axis. The flow path extends through the first and second portions, and longitudinal movement of the second portion towards the first portion moves the fingers radially inward.

In addition to one or more of the features described above or below, or as an alternative, further embodiments could include the first portion fixed with respect to the vacuum hose, and the second portion may be movable with respect to the vacuum hose.

In addition to one or more of the features described above or below, or as an alternative, further embodiments could include a venturi operatively connected to the second end of the vacuum hose.

In addition to one or more of the features described above or below, or as an alternative, further embodiments could include a source of compressed air directed at the venturi.

A method of operating a fuel vent connector with respect to a fuel vent opening includes inserting the fuel vent connector within the fuel vent opening, the fuel vent connector having a longitudinal axis; and latching the fuel vent connector within the fuel vent opening using a non-rotating motion of a main body of the fuel vent connector with respect to the longitudinal axis.

In addition to one or more of the features described above or below, or as an alternative, further embodiments could include the fuel vent connector having a flow path along the longitudinal axis, a first portion pivotally supporting a plurality of fingers, each finger amongst the plurality of fingers having a latching head biased radially outwardly and configured to latch with the fuel vent opening, and a second portion biased longitudinally away from the first portion with respect to the longitudinal axis, the flow path extending through the first and second portions.

In addition to one or more of the features described above or below, or as an alternative, further embodiments could include inserting the fuel vent connector within the fuel vent opening to compress the fingers radially inward.

In addition to one or more of the features described above or below, or as an alternative, further embodiments could include the fingers compressed by a flange within the fuel vent opening, and latching the fuel vent connector within the fuel vent opening may include moving the latching head of each finger past the flange to return the plurality of fingers to their radially outwardly biased position.

In addition to one or more of the features described above or below, or as an alternative, further embodiments could include unlatching the fuel vent connector from the fuel vent opening by squeezing the second portion towards the first portion in a longitudinal direction, and moving the second portion towards the first portion may move the fingers radially inward.

In addition to one or more of the features described above or below, or as an alternative, further embodiments could include the first portion of the fuel vent connector operatively connected to a vacuum hose.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
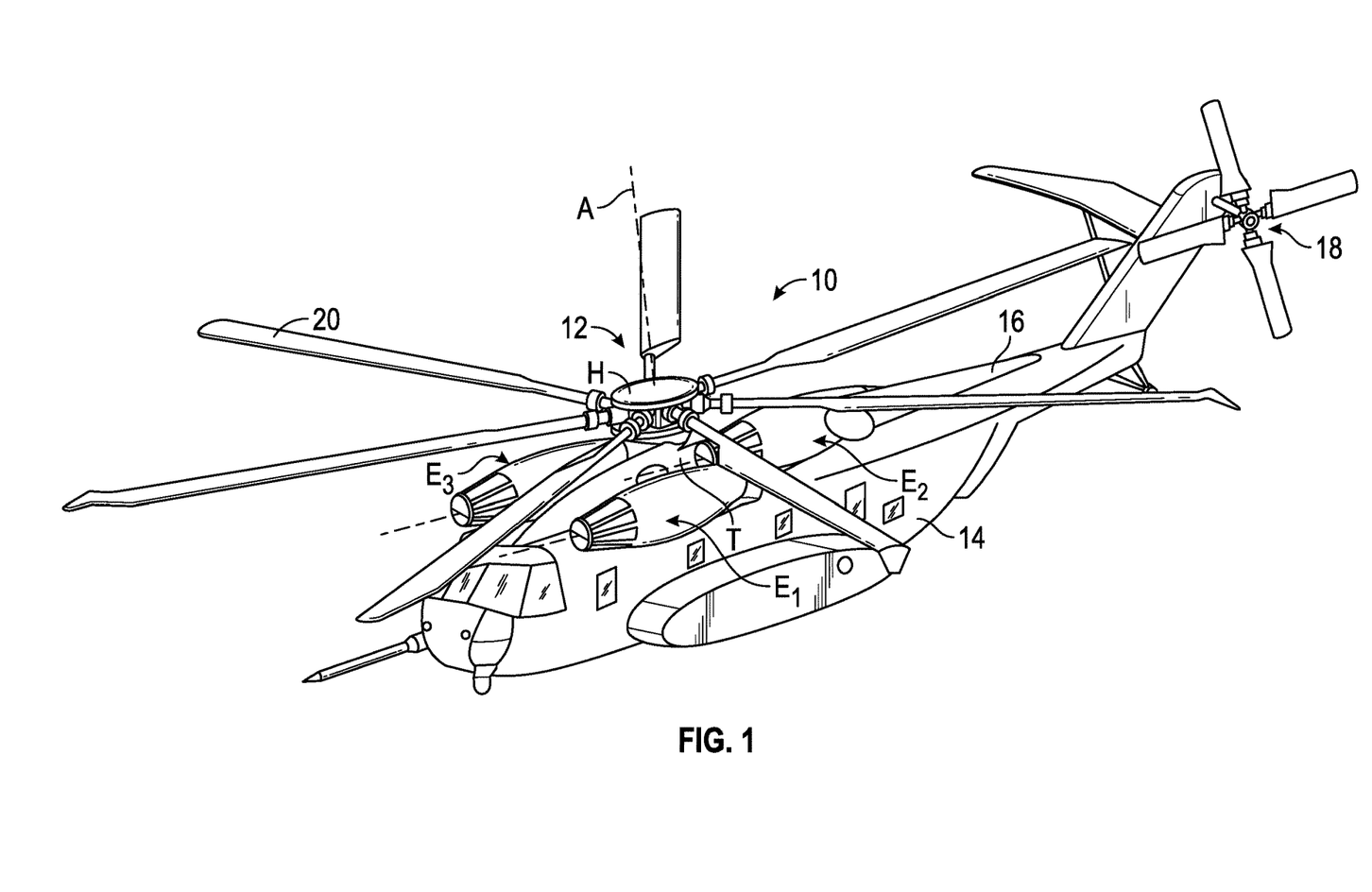
FIG. 1 is a perspective view of an embodiment of a rotary wing aircraft vehicle.

FIG. 1 schematically illustrates an embodiment of a vehicle 10, such as a rotary wing aircraft having a main rotor assembly 12. The vehicle 10 includes an airframe 14 having an extended tail 16 which mounts a tail rotor system 18, such as an anti-torque system, a translational thrust system, a pusher propeller, a rotor propulsion system, and the like. The main rotor assembly 12 includes a plurality of rotor blade assemblies 20 mounted to a rotor hub H. The main rotor assembly 12 is driven about an axis of rotation A through a main gearbox (illustrated schematically at T) by one or more engines E, such as, by example only, $E_1$, $E_2$, and $E_3$. Although a particular helicopter configuration is illustrated and described in the disclosed embodiment as the vehicle 10, other vehicles, configurations, equipment, and/or machines, such as high speed compound rotary wing aircraft with supplemental translational thrust systems, dual contra-rotating, coaxial rotor system aircraft, tilt-rotor and tilt-wing aircraft, and fixed wing aircraft, as well as land and other equipment and vehicles having fuel tanks, will also benefit from embodiments.

Figure 2:
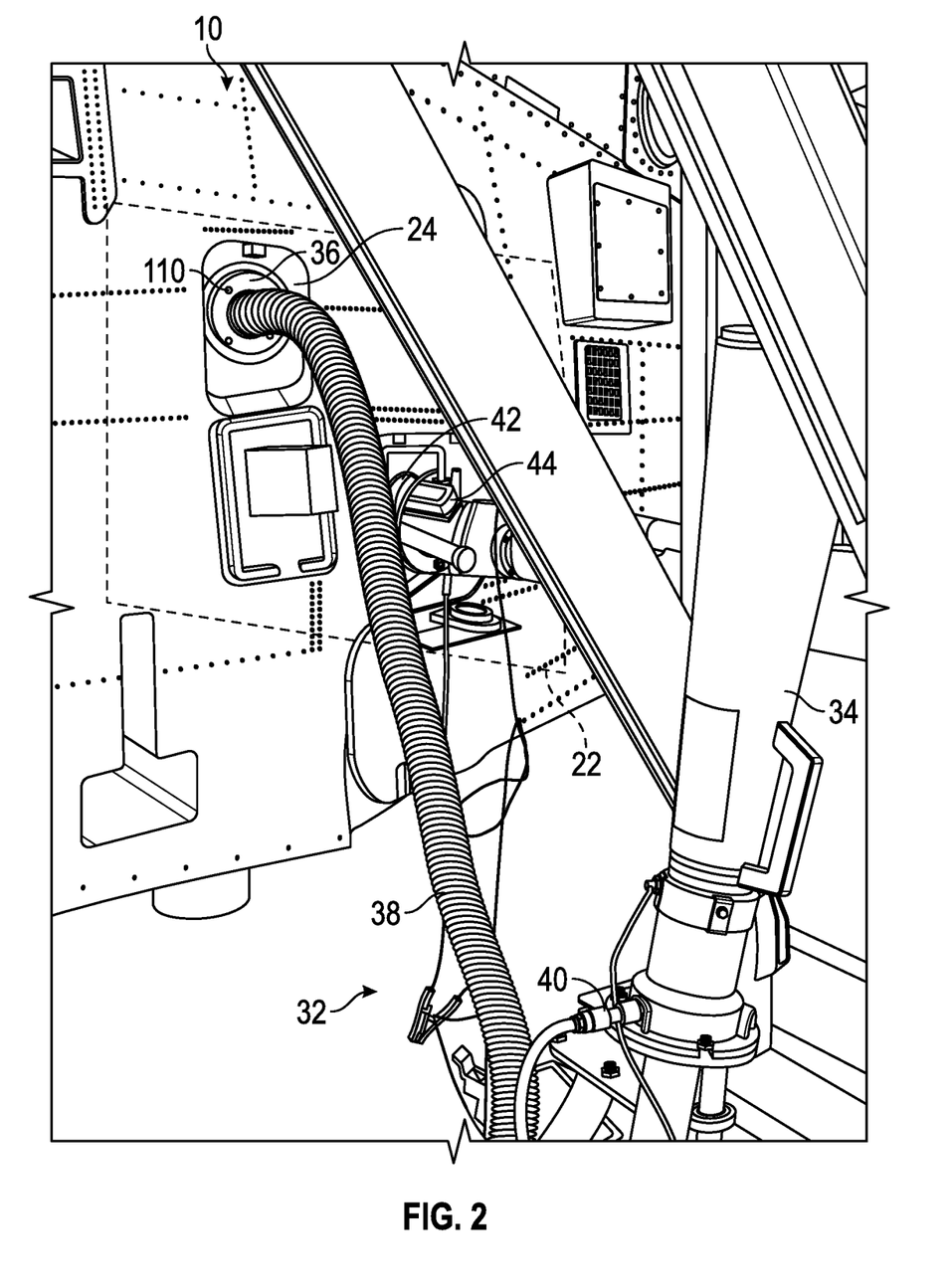
FIG. 2 is a perspective view of a portion of the vehicle of FIG. 1 in combination with an embodiment of a venting system.
Figure 3:
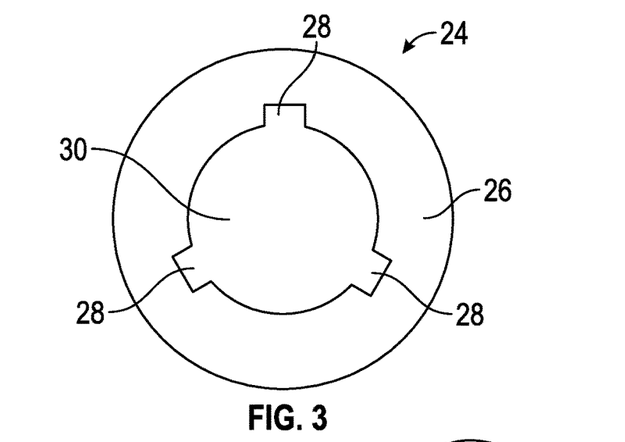
FIG. 3 shows a plan view of an embodiment of a flange within a fuel vent opening in the vehicle of the FIG. 2.

FIG. 2 illustrates one embodiment of a section of the vehicle 10 that holds a fuel tank 22, shown diagrammatically in phantom. The fuel tank 22, or fuel cell, may have any shape and configuration appropriate for the vehicle 10. A fuel vent opening 24 provides venting to the fuel tank 22 and includes a flange 26 (see FIG. 3) having a plurality of notches 28. While there are typically three notches 28 in the fuel vent opening flange 26, an alternate number of notches 28 could alternatively be designed as part of fuel vent opening 24. Also, while only one fuel vent opening 24 is depicted, the fuel tank 22 within the vehicle 10 may have more than one fuel vent opening 24. The flange 26 includes a passage 30. Attachable to the fuel vent opening 24 is a venting system 32. The venting system 32 includes, in part, a venturi 34, a fuel vent connector 36, and a vacuum hose 38 operatively connected between the connector 36 and the venturi 34. The venturi 34 runs off of compressed air. That is, air pressure from a source 40 of compressed air enters the venturi 34 to increase the velocity exiting the venturi 34 in order to create a vacuum through the vacuum hose 38. That is, when compressed air is forced through the venturi 34, the velocity of the compressed air increases, thus creating suction upstream of the venturi 34. The venturi 34 is employed in lieu of an electrical vacuum cleaner to avoid the potential for sparks. The venting system 32 provides suction to the fuel vent opening 24 to remove fumes from the fuel tank 22, such as during a refueling process. That is, the venting system 32 may be employed at the same time that the fuel tank 22 is being filled through a fuel tank opening 42. FIG. 2 illustrates one embodiment of a refueling connector 44, which connects the fuel tank opening 42 to a source of fuel to refill the fuel tank 22 as needed.

Figure 4:
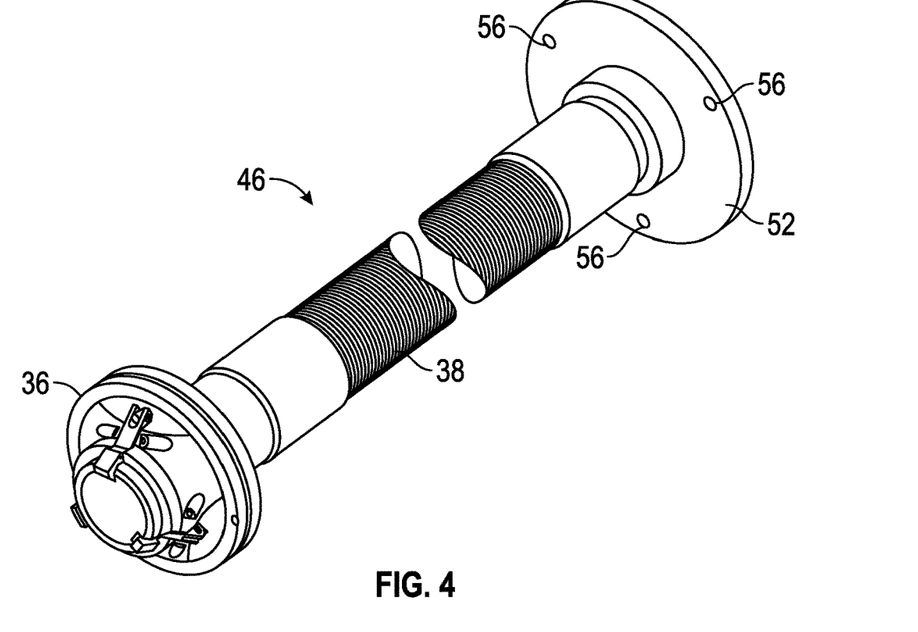
FIG. 4 is a perspective view of an embodiment of a connection assembly for the venting system of FIG. 2.
Figure 5:
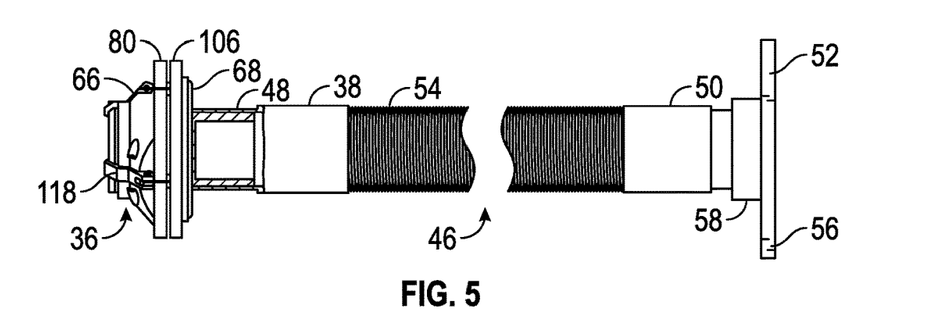
FIG. 5 is a side view and partial cutaway view of the connection assembly of FIG. 4.

A connection assembly 46 for the venting system 32 is shown in FIGS. 4 and 5. The connection assembly 46 includes the vacuum hose 38 having a first end 48 and a second end 50, the fuel vent connector 36 (a first connector) secured to the first end 48 of the vacuum hose 38, and a second connector 52 secured to the second end 50 of the vacuum hose 38. The vacuum hose 38 includes a flexible section 54 connected between the first and second ends 48, 50 of the vacuum hose 38. The first and second ends 48, 50 may include non-flexible portions and connecting areas necessary to connect the flexible section 54 of the vacuum hose 38 between the fuel vent connector 36 and the second connector 52. The second connector 52 may include a plurality of apertures 56 for receiving securement devices (not shown) for fixedly securing the second connector 52 relative to the venturi 34. The second connector 52 may further include a cylindrical section 58 for receiving the second end 50 of the vacuum hose 38.

With additional reference to FIGS. 6-14, embodiments of the fuel vent connector 36 will now be described. The fuel vent connector 36 extends along a longitudinal axis 60 and includes an interior flowpath 62. When connected to the vacuum hose 38, the flowpath 62 is in fluidic communication with an interior 64 of the vacuum hose 38. The fuel vent connector 36 includes a first portion 66 that is configured for at least partial insertion into the fuel vent opening 24 and through the passage 30 in the flange 26 in the fuel vent opening 24. The fuel vent connector 36 further includes a second portion 68 generally interposed between the vacuum hose 38 and the first portion 66. A biasing device, such as a plurality of springs 70, is utilized to bias the second portion 68 away from the first portion 66, such that the first portion 66 and the second portion 68 are separated from each other by a gap 72. Maintaining the first portion 66 relative to the second portion 68 are a plurality of rods 74. The rods 74 may be fixedly secured relative to the second portion 68, and the rods 74 may be moved longitudinally through the first portion 66. The biasing device, such as springs 70, may surround respective rods 74. The rods 74 extend at least substantially parallel to the longitudinal axis 60 of the fuel vent connector 36.

The first portion 66 includes a main body 76 having a bore 78 for partially defining the flowpath 62 of the connector 36. The main body 76 further includes a first outer lip region 80, an end region 82 that may have a generally cylindrical shape, and an intermediate region 84 that may have a generally frustoconical shape disposed between the first outer lip region 80 and the end region 82. While generally cylindrical, the end region 82 may be interrupted by a plurality of finger receiving areas 86. The intermediate region 84 is designed for easy guidance of the connector 36 towards the fuel vent opening 24. The first outer lip region 80 has a greater width than a width of the end region 82, such as a larger outer diameter than an outer diameter of the end region 82. As can be appreciated, the smaller diameter of the end region 82 allows the end region 82 to be at least partially inserted through the fuel vent opening 24, while the larger diameter of the first outer lip region 80 blocks the remainder of the connector 36 from being inserted through the fuel vent opening 24. That is, the outer lip region 80 is designed to have a larger width (such as a larger diameter) than a width of the fuel vent opening 24 and a width of the passage 30 of the flange 26. The main body 76 of the first portion 66 includes apertures 88 (best shown in FIGS. 10 and 11) for allowing the passage of the rods 74 therethrough. An inner face 90 of the main body 76 (facing an inner face 92 of the second portion 68) may further include spring receiving indents 94 (FIG. 8) surrounding a portion of the apertures 88. The spring receiving indents 94 provide a shoulder wall 96 for a first end of the springs 70.

Figure 12:
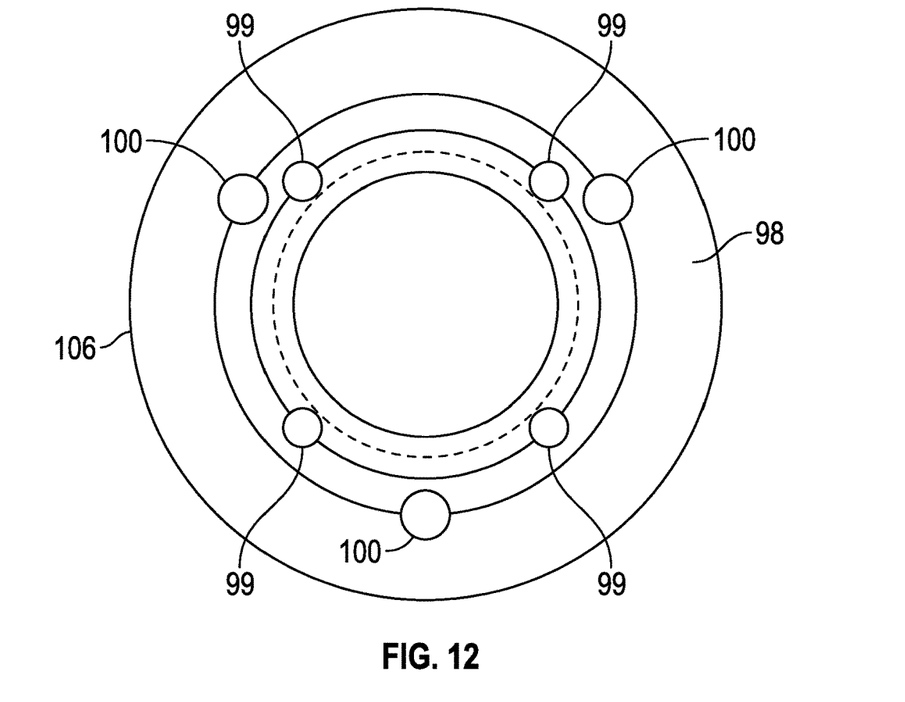
FIG. 12 is a rear plan view of an embodiment of a first plate of a second portion of the fuel vent connector.
Figure 13:
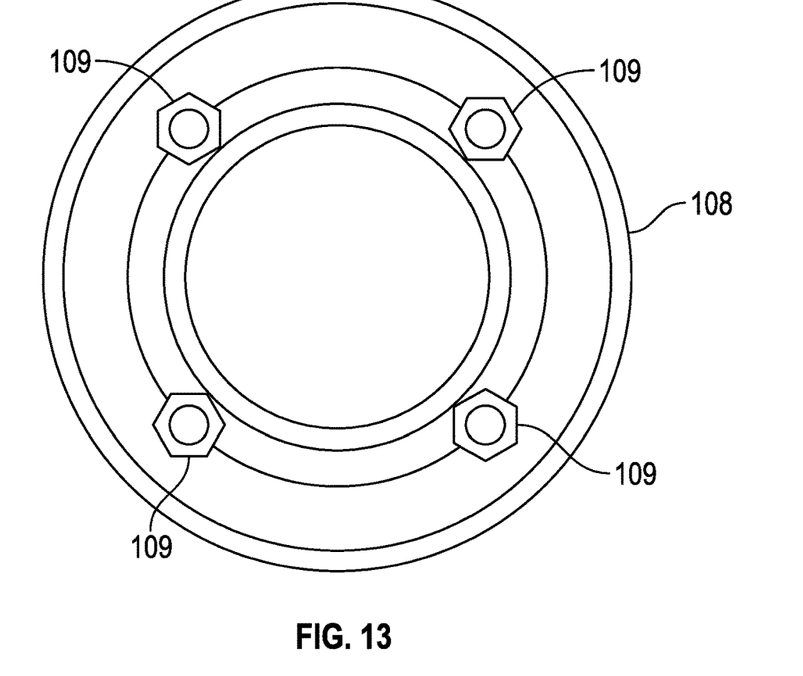
FIG. 13 is a rear plan view of an embodiment of a second plate of a second portion of the fuel vent connector; and, FIG. 14 is a side plan view of an embodiment of a finger for the fuel vent connector.

The second portion 68 includes a first plate 98 having apertures 100 (FIGS. 8 and 12) for receipt of the rods 74 therethrough. The apertures 100 may be spaced apart 120 degrees from each other, with respect to the longitudinal axis 60. The inner face 92 of the second portion 68 and first plate 98 (facing the inner face 90 of the first portion 66) may further include spring receiving indents 102 surrounding a portion of the apertures 100. The spring receiving indents 102 provide a shoulder wall 104 for a second end of the springs 70. The first plate 98 further includes a second outer lip region 106. In one embodiment, the second outer lip region 106 has substantially the same outer dimensions as the first outer lip region 80. While providing both first and second outer lip regions 80, 106 with substantially the same outer dimensions provides ease in handling as well as an aesthetically pleasing appearance, the outer dimension of the second outer lip region 106 is not restricted thereto as long as the first and second outer lip regions 80, 106 may be grasped and squeezed together against the bias of the connector 36 to reduce or eliminate the gap 72 between the inner faces 90, 92, as will be further described below. The second portion 68 further includes a second plate 108 secured to the first plate 98 using securement devices 110 such as, but not limited to, bolts, shown in FIG. 2. The securement devices 110 pass through apertures 109 in the second plate 108 that align with apertures 99 in the first plate 98 (FIGS. 12 and 13). The illustrated embodiment includes four securement devices 110, however an alternate number of securement devices 110 may be employed. The securement devices 110 may be visible from an outer surface of the second plate 108, as shown in FIG. 2. The first and second plates 98, 108 may concentrically surround one or more guide rings 112, 114 (FIG. 6) that in turn surround a flow tube 116. The flow tube 116 is connected to the bore 78 of the first portion 66 and to the vacuum hose 38 (or to one or more connectors connecting the flow tube 116 to the vacuum hose 38) such that the flow path 62 is continuous to the interior 64 of the vacuum hose 38. That is, the flow path 62 is not interrupted by the gap 72 because the flow tube 116 is radially interior of the gap 72. The guide rings 112, 114 may be made of a non-stick material, or coated with a non-stick coating, such as, but not limited to, a Teflon® coating, so that the second portion 68 can move smoothly longitudinally with respect to the flow tube 116, towards and away from the first portion 66. Also, the guide rings 112, 114 prevent sand and other debris from entering the fuel vent connector 36. When the first and second outer lip regions 80, 106 are grasped together and squeezed together, the second portion 68 of the connector 36 is pushed against the spring bias of the springs 70 towards the first portion 66. As the flow tube 116 is connected to both the first portion 66 and the vacuum hose 38, the flow path 62 of the connector 36 remains undisturbed during compression of the first and second outer lip regions 80, 106 against the bias of the springs 70.

Figure 14:
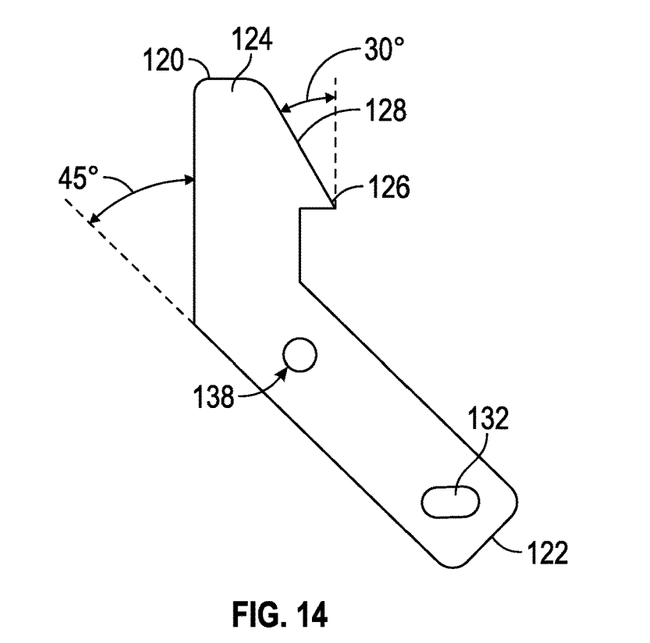

Attached to both the first portion 66 and the rods 74 is a plurality of pivotal fingers 118. In one embodiment, the number of fingers 118 matches the number of notches 28 within the flange 26 of the fuel vent opening 24, and therefore the illustrated embodiment includes three pivotal fingers 118. Each finger 118 may be the same, or at least substantially the same, and an enlarged side view of one finger 118 is shown in FIG. 14. The finger 118 includes a first end 120 and a second end 122. The first end 120 includes a latching head 124 having a projection 126 that protrudes radially outwardly from a tapered camming surface 128. In one embodiment, the camming surface 128 may have an angle of approximately 30 degrees from the longitudinal axis 60 of the connector 36. The second end 122 of the finger 118 may include a generally U-shaped portion 130 (see FIG. 9) for receiving the rod 74 that extends through the aligned apertures 88, 100 of the first and second portions 66, 68, respectively. Adjacent the second end 122 is a pair of slots 132 (one shown in FIG. 14) that align with a pin opening 134 in the rod 74. A pin 136 (FIG. 9) passing through the slots 132 and the pin opening 134 in the rod 74 thus secures the finger 118 to the rod 74. Between the U-shaped portion 130 and the latching head 124 is a pivot hole 138. A pivot pin 140 (FIG. 9) passes through the pivot hole 138 of the finger 118 and through adjacent pivot pin pathways 142 (FIG. 10) in the main body 76 of the first portion 66 such that the finger 118 is pivotally secured to the main body 76 of the first portion 66. The finger 118 may be angled from the first end 120 to the second end 122, to generally follow an exterior contour of the finger receiving areas 86 in the main body 76 of the first portion 66. In one embodiment, the second end 122 may be angled about 45 degrees from the first end 120.

Figure 6:
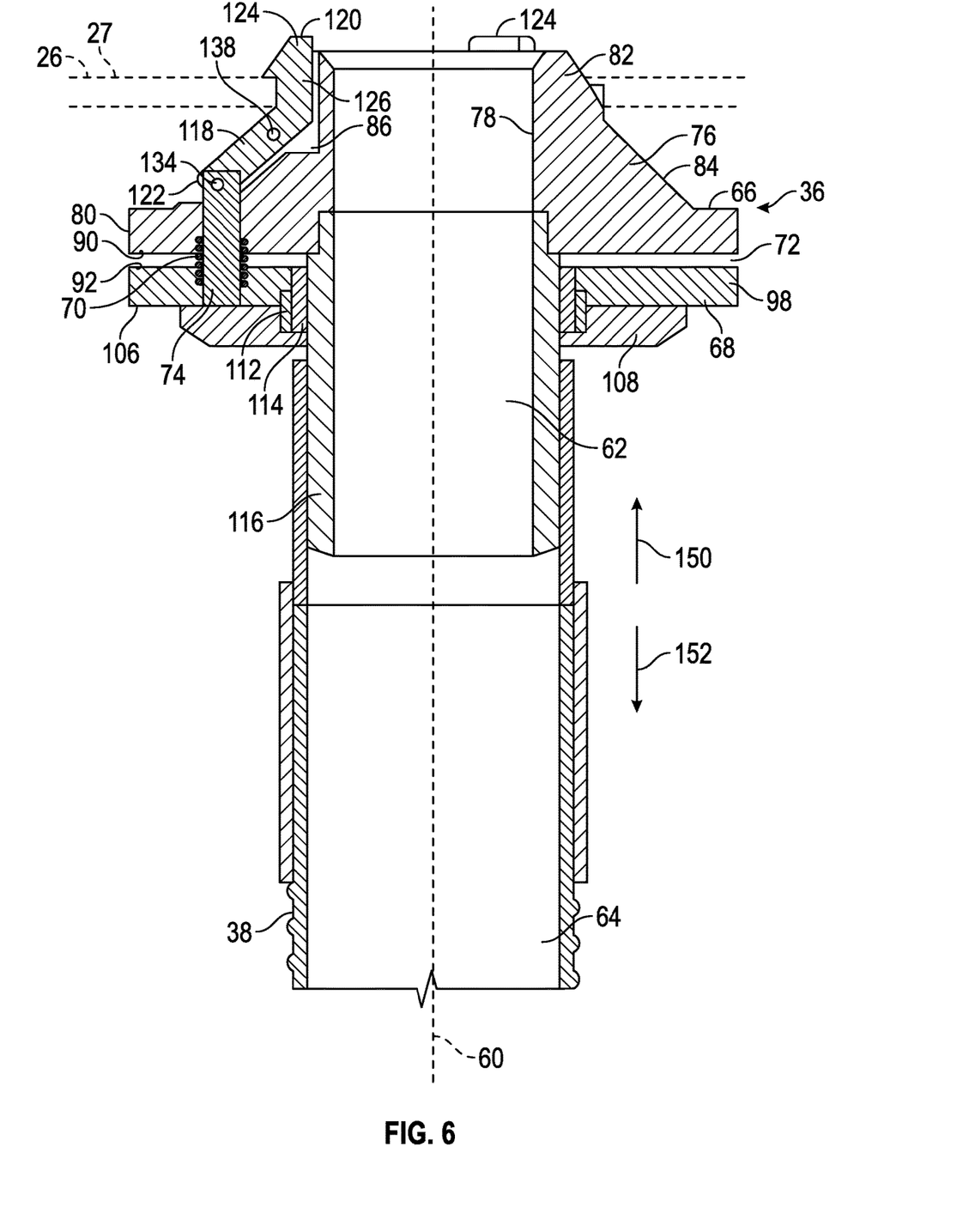
FIG. 6 is a sectional view of a portion of the connection assembly of FIG. 5 in its biased condition.
Figure 7:
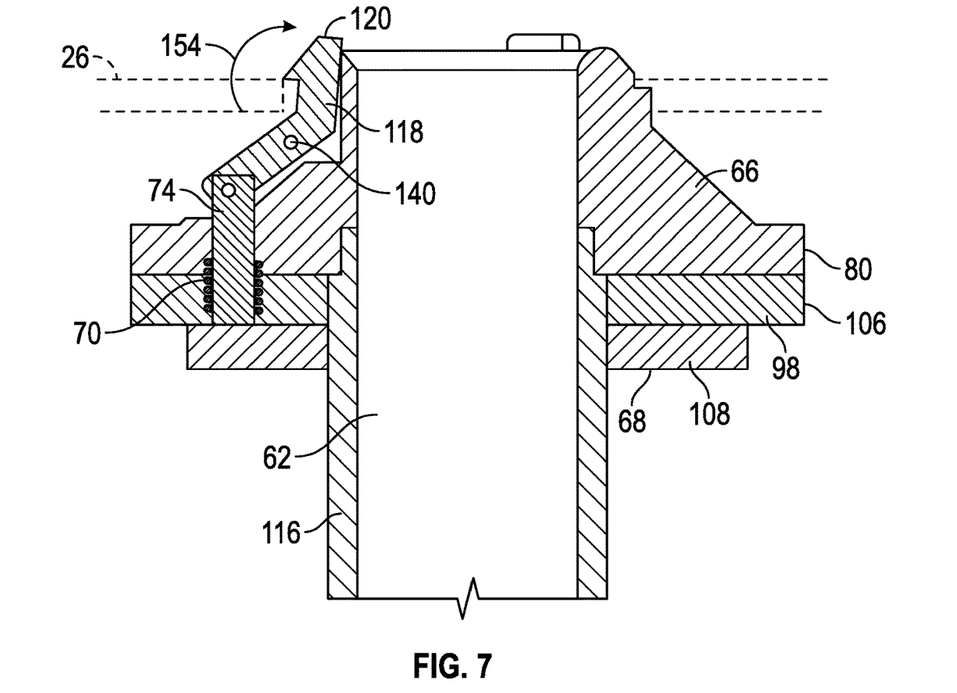
FIG. 7 is a sectional view of a portion of the connection assembly of FIG. 5 in its compressed condition.
Figure 8:
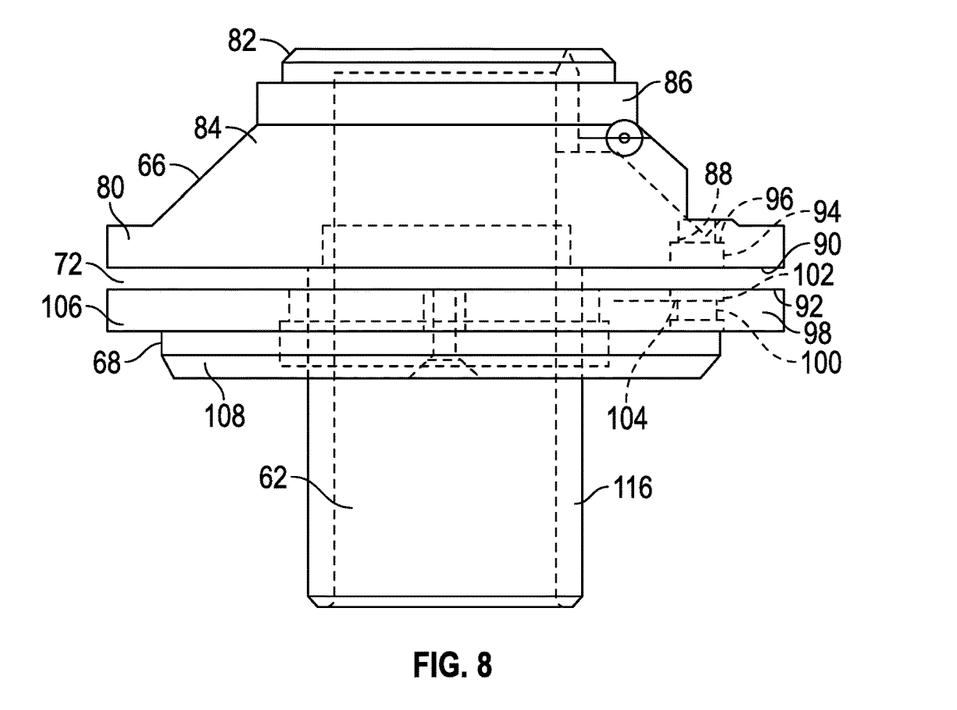
FIG. 8 is a diagrammatic view of portions of an embodiment of a fuel vent connector for the connection assembly of FIG. 5.
Figure 9:
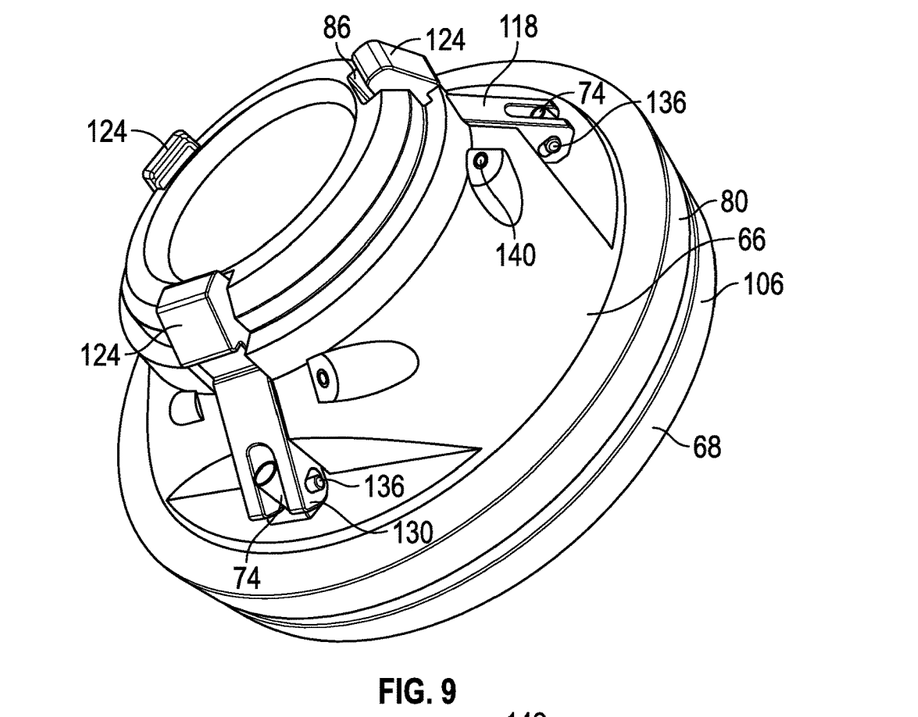
FIG. 9 is a perspective view of an embodiment of the fuel vent connector.
Figure 10:
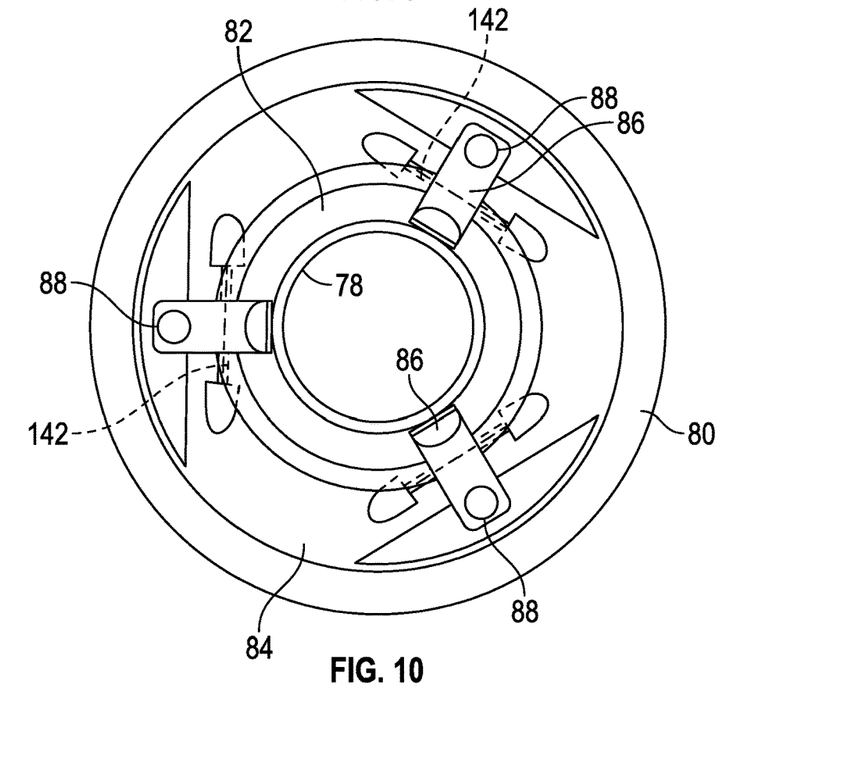
FIG. 10 is front plan view of an embodiment of a first portion of the fuel vent connector.
Figure 11:
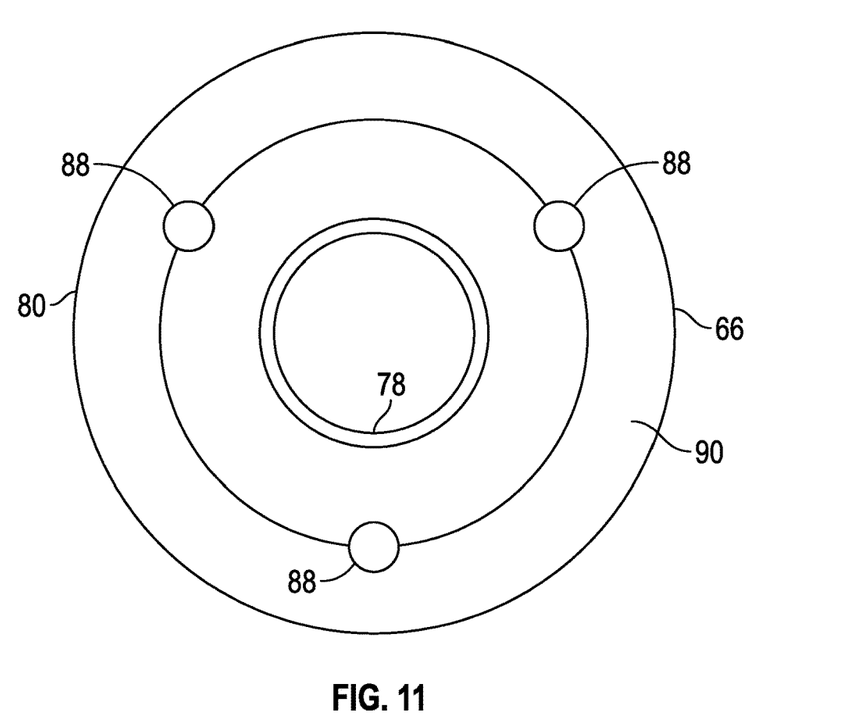
FIG. 11 is a rear plan view of the first portion of the fuel vent connector.

In an operation of utilizing the connector 36, the first portion 66 is partially inserted into the fuel vent opening 24 in direction 150 (FIG. 6). The fingers 118 may be aligned with the notches 28 in the flange 26 and then the fuel vent connector 36 is pushed longitudinally through the passage 30. During insertion of the end region 82 of the first portion 66 into the fuel vent opening 24, the latching heads 124 will move radially inward when the camming surfaces 128 slide against an inner surface of the notches 28. When the projections 126 of the fingers 118 pass the flange 26 in the fuel vent opening 24, the latching heads 124 will move back radially outwardly to the biased condition shown in FIG. 6 with the projection 126 lying on the inner face 27 of the flange 26. In this position, the fuel vent connector 36 is latched within the fuel vent opening 24 and blocked from unintentional removal therefrom as the projections 126 are blocked by the inner face 27 of the flange 26. That is, the connector 36 cannot be moved in direction 152. As all three fingers 118 are biased radially outwardly onto the flange 26, no rotation of the connector 36 is required to retain the connector 36 within the fuel vent opening 24. Only a movement of the connector 36 in longitudinal direction 150 is required for insertion and latching. As the insertion movement itself compresses the fingers 118 initially inwardly, there is also no need to compress the first and second portions 66, 68 of the connector 36 together for insertion, as this action will occur automatically during insertion of the fuel vent connector 36 into the passage 30 of the flange 26. However, when it is desired to remove the connector 36 from the fuel vent opening 24, e.g., by moving the connector 36 in direction 152, an operator must grasp the first and second outer lip regions 80, 106 together, reducing or eliminating the gap 72 as shown in FIG. 7, to move the fingers 118 radially inward in order to reduce the overall outer diameter of the fuel vent connector 36 at the end region 82, enough to remove the connector 36 from the fuel vent opening 24. By compressing the second portion 68 towards the first portion 66, the rods 74 are pushed further through the first portion 66, pushing the connected second ends 122 of the fingers 118 such that the first ends 120 of the fingers 118 move radially inwardly about the pivot pins 140. The latching heads 124 move radially inward by pivoting in direction 154 about the pivot pins 140, and the latching heads 124 move further into the finger receiving areas 86 at the end region 82 as shown in FIG. 7, and then the connector 36 can be moved longitudinally in direction 152. Once the latching heads 124 have cleared the fuel vent opening 24, an operator can cease the compression of the second portion 68 towards the first portion 66 and the second portion 68 will return to its biased position with respect to the first portion 66 and the vacuum hose 38, with the gap 72 between the first and second portions 66, 68.

While an operation of the fuel vent connector 36 with respect to a particular flange 26 has been described, the fuel vent connector 36 may also be utilized in other designs of fuel vent openings. For example, the inner surface 27 of the flange 26 may instead be an additional notch having a greater outer radius than notches 28 for the projections 126 to rest upon. Or, alternatively, the flange 26 could be provided with a constant inner diameter (no notches 28) and a number of fingers 118 could be utilized to rest the latching heads 124 on any area of the inner surface 27 of the flange 26. For the embodiments described herein, the fuel vent connector 36 is operable for insertion with the construction of existing fuel vent openings 24.

Thus, the venting system 32 includes a fuel vent connector 36 that does not pose a risk to a lanyard hanging from the fuel vent opening 24, because the fuel vent connector 36 is latched into the fuel vent opening 24 using a non-rotating motion. This eliminates the risk that the lanyard will be sheared and dropped into the fuel tank 22. Also, because the fuel vent connector 36 does not need to support the weight of the remainder of the venting system 32, the connector 36 may be smaller than previous connectors. That is, with the venturi 34 seated on ground level as shown in FIG. 2, instead of supported in the air with PVC pipes, the connector 36 need only be designed to adequately connect the vacuum hose 38 to the fuel vent opening 24, and not additionally designed to support weight of a venting system. When installed in the fuel vent opening 24, the flexible portion 54 of the vacuum hose 38 allows connection from the connector 36 at the fuel vent opening 24 to the venturi 34 at ground level.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:
1. A fuel vent connector having a longitudinal axis, the fuel vent connector comprising:
 a flow path along the longitudinal axis;
 a first portion pivotally supporting a plurality of fingers, each finger amongst the plurality of fingers having a latching head biased radially outwardly and configured to latch within a fuel vent opening;

a second portion biased longitudinally away from the first portion with respect to the longitudinal axis; and a plurality of rods fixedly attached to the second portion and movable through the first portion, wherein each finger includes a first end having the latching head and a second end connected to a respective rod amongst the plurality of rods, wherein the flow path extends through the first and second portions, and longitudinal movement of the second portion towards the first portion moves the fingers radially inward.

2. The fuel vent connector of claim 1, wherein the first portion is fixedly attached to a vacuum hose, and the second portion is longitudinally movable with respect to the vacuum hose.

3. The fuel vent connector of claim 1, further comprising a plurality of springs between the first and second portions.

4. The fuel vent connector of claim 1, wherein each finger includes a pivot point between the first and second ends of the finger, and longitudinal movement of the second portion towards the first portion moves the rods to pivot the plurality of fingers radially inward.

5. The fuel vent connector of claim 1, wherein each of the plurality of rods extends substantially parallel to the longitudinal axis of the fuel vent connector.

6. The fuel vent connector of claim 1, further comprising a plurality of springs, each spring amongst the plurality of springs surrounding a respective rod amongst the plurality of rods, wherein the plurality of springs bias the second portion away from the first portion.

7. The fuel vent connector of claim 1, wherein each of the first and second portions includes an outer lip region, the first portion further including an end region longitudinally opposite the outer lip region of the first portion, the latching head of each finger disposed adjacent the end region, and the outer lip region of the first portion having a greater width than an end region of the first portion.

8. The fuel vent connector of claim 7, wherein the outer lip region of the first portion has a substantially same width as the outer lip region of the second portion.

9. The fuel vent connector of claim 1 wherein the first portion includes a main body, the main body having an end region, an outer lip region, and a first set of rod receiving apertures, the end region configured for insertion into the fuel vent opening, and the outer lip region having a greater width than a width of the end region, and the second portion includes a second set of rod receiving apertures, the connector further comprising a plurality of rods received respectively within the first and second set of rod receiving apertures, each finger amongst the plurality of fingers including a first end having the latching head and a second end connected to one of the plurality of rods, each finger pivotally attached to the first portion between the first and second ends.

10. A venting system comprising:
a vacuum hose having a first end and a second end; and,
a fuel vent connector operatively connected to the first end of the vacuum hose, the fuel vent connector having a longitudinal axis and including:

a flow path along the longitudinal axis, the flow path fluidically connected to an interior of the vacuum hose;

a first portion pivotally supporting a plurality of fingers, each finger amongst the plurality of fingers having a latching head biased radially outwardly and configured to latch within a fuel vent opening;

a second portion biased longitudinally away from the first portion with respect to the longitudinal axis; and a venturi operatively connected to the second end of the vacuum hose, wherein the flow path extends through the first and second portions, and longitudinal movement of the second portion towards the first portion moves the fingers radially inward.

11. The venting system of claim 10, wherein the first portion is fixed with respect to the vacuum hose, and the second portion is movable with respect to the vacuum hose.

12. The venting system of claim 10, further comprising a source of compressed air directed at the venturi.

13. A method of operating a fuel vent connector with respect to a fuel vent opening, the method comprising:
inserting the fuel vent connector within the fuel vent opening, the fuel vent connector having a longitudinal axis and including a first portion supporting a plurality of fingers and a second portion supporting a plurality of rods that connect with the plurality of fingers; and
latching the fuel vent connector within the fuel vent opening with the plurality of fingers using a non-rotating motion of a main body of the fuel vent connector with respect to the longitudinal axis.

14. The method of claim 13, wherein the fuel vent connector includes:
a flow path along the longitudinal axis;
wherein, each finger amongst the plurality of fingers having a latching head biased radially outwardly and configured to latch within the fuel vent opening; and,
wherein the second portion is biased longitudinally away from the first portion with respect to the longitudinal axis, the flow path extending through the first and second portions.

15. The method of claim 14, wherein inserting the fuel vent connector within the fuel vent opening compresses the fingers radially inward.

16. The method of claim 15, wherein the fingers are compressed by a flange within the fuel vent opening and latching the fuel vent connector within the fuel vent opening includes moving the latching head of each finger past the flange to return the plurality of fingers to their radially outwardly biased position.

17. The method of claim 14, further comprising unlatching the fuel vent connector from the fuel vent opening by squeezing the second portion towards the first portion in a longitudinal direction, wherein moving the second portion towards the first portion moves the plurality of fingers radially inward.

18. The method of claim 14, wherein the first portion of the fuel vent connector is operatively connected to a vacuum hose.

* * * * *